US012608470B2

(12) United States Patent
Liu et al.

(10) Patent No.: US 12,608,470 B2
(45) Date of Patent: Apr. 21, 2026

(54) CYBERATTACK COUNTERMEASURE CIRCUITS AND METHODS

(71) Applicant: Microsoft Technology Licensing, LLC, Redmond, WA (US)

(72) Inventors: Kunyan Liu, San Diego, CA (US); Yucong Tao, La Jolla, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 18/505,865

(22) Filed: Nov. 9, 2023

(65) Prior Publication Data

US 2025/0156534 A1      May 15, 2025

(51) Int. Cl.
       *G06F 21/55*             (2013.01)
(52) U.S. Cl.
       CPC ...... *G06F 21/554* (2013.01); *G06F 2221/034* (2013.01)
(58) Field of Classification Search
       CPC ........................ G06F 21/554; G06F 2221/034
       See application file for complete search history.

(56) References Cited

U.S. PATENT DOCUMENTS

| | | | | |
|---|---|---|---|---|
| 10,263,767 | B1 * | 4/2019 | Doi ........................ | G06F 21/755 |
| 2019/0028263 | A1 * | 1/2019 | Avital .................... | G06F 21/755 |
| 2020/0159567 | A1 * | 5/2020 | Hershman ............. | G06F 21/567 |
| 2022/0366992 | A1 * | 11/2022 | Roethig ................. | H03K 3/84 |
| 2023/0027064 | A1 * | 1/2023 | Langhammer ........ | G06F 1/3237 |

| | | | | |
|---|---|---|---|---|
| 2023/0079599 | A1 * | 3/2023 | Kilian ........... | G01R 31/318583 |
| | | | | 714/726 |
| 2023/0146861 | A1 * | 5/2023 | Bouillon ............ | H03K 19/0813 |
| | | | | 716/104 |
| 2023/0155576 | A1 * | 5/2023 | Vezyrtzis ............... | H03K 5/151 |
| | | | | 327/199 |
| 2023/0194606 | A1 * | 6/2023 | Rajeev ........... | G01R 31/318552 |
| | | | | 714/726 |
| 2023/0243887 | A1 * | 8/2023 | Pradeep ............. | G01R 31/3177 |
| | | | | 714/731 |
| 2023/0244820 | A1 * | 8/2023 | Seidl .................... | H03K 19/003 |
| | | | | 326/8 |
| 2023/0291395 | A1 * | 9/2023 | Jouanneau ........... | H03K 3/0315 |
| 2023/0350453 | A1 * | 11/2023 | Mathur .................. | H03K 3/013 |
| 2024/0003971 | A1 * | 1/2024 | Leinonen ....... | G01R 31/318541 |
| 2024/0061039 | A1 * | 2/2024 | Kang ........... | G01R 31/318525 |
| 2024/0112748 | A1 * | 4/2024 | Kumar .................. | G11C 29/32 |
| 2024/0265100 | A1 * | 8/2024 | Pedersen ................ | H04L 9/003 |
| 2024/0290363 | A1 * | 8/2024 | Mathur .................... | G11C 8/18 |

(Continued)

OTHER PUBLICATIONS

International Search Report and Written Opinion received for PCT Application No. PCT/US2024/052176, Dec. 11, 2024, 16 pages.

*Primary Examiner* — Stephen T Gundry
(74) *Attorney, Agent, or Firm* — Seed Intellectual Property Law Group LLP

(57) ABSTRACT

Embodiments of the present disclosure include countermeasure circuit techniques for cyberattacks. In one embodiment, portions of combinational logic receive shared input bit groups and produce shared output bit groups. Shared output bit groups may be coupled between series configured combinational logic portions using control gates. Clock signals are delayed to activate the control gates after the outputs are stable. In some embodiments, a first combinational logic group and second combinational logic group operate on a clock and inverse clock.

20 Claims, 3 Drawing Sheets

(56) References Cited

U.S. PATENT DOCUMENTS

| 2024/0320410 | A1* | 9/2024 | Kim | G01R 31/318552 |
| 2024/0385801 | A1* | 11/2024 | Mori | G06F 5/01 |
| 2024/0388281 | A1* | 11/2024 | Fan | H03K 3/037 |
| 2024/0412794 | A1* | 12/2024 | Yokoyama | G11C 11/419 |

* cited by examiner

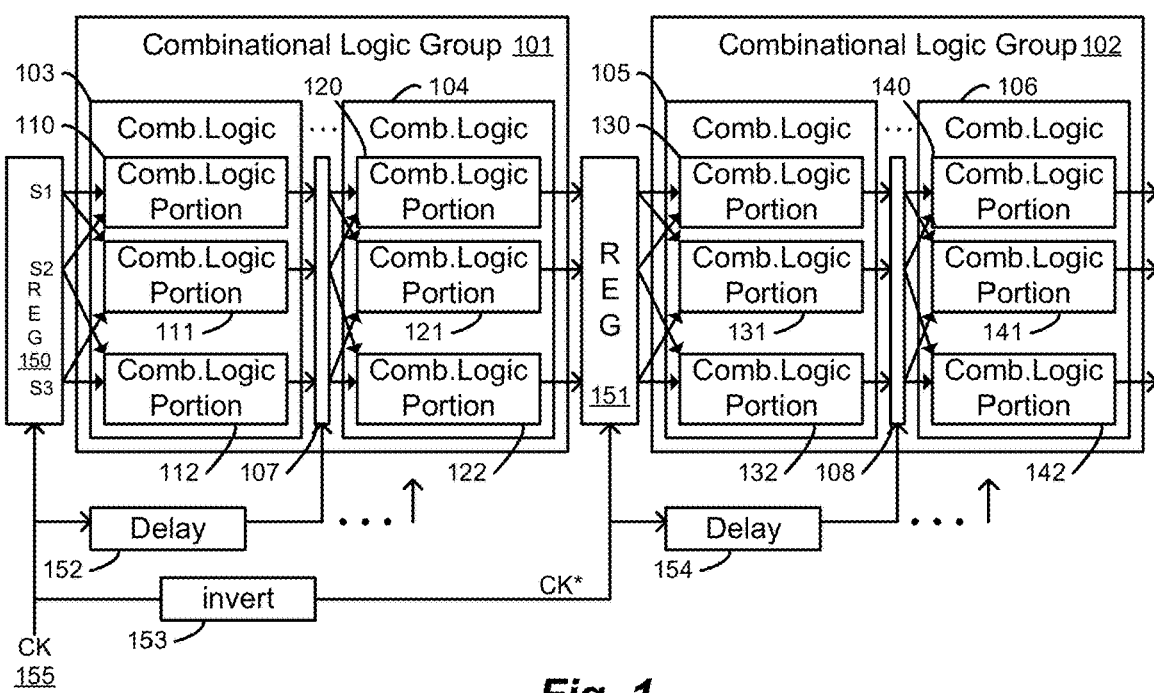

Fig. 1

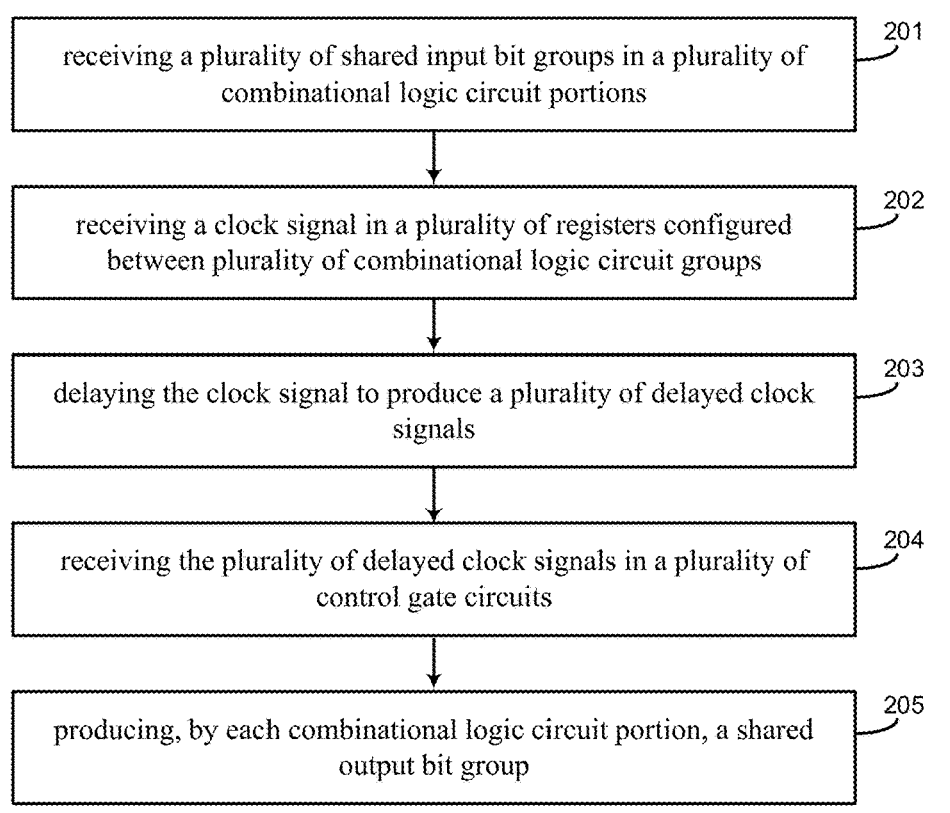

| | |
|---|---|
| receiving a plurality of shared input bit groups in a plurality of combinational logic circuit portions | 201 |
| receiving a clock signal in a plurality of registers configured between plurality of combinational logic circuit groups | 202 |
| delaying the clock signal to produce a plurality of delayed clock signals | 203 |
| receiving the plurality of delayed clock signals in a plurality of control gate circuits | 204 |
| producing, by each combinational logic circuit portion, a shared output bit group | 205 |

Fig. 2

CYBERATTACK COUNTERMEASURE CIRCUITS AND METHODS

BACKGROUND

The present disclosure relates generally to semiconductor circuits, and in particular, to cyberattack countermeasure circuits and methods.

Recently, power analysis methods have become an attack path to extract sensitive information (such as cryptographic keys) from semiconductor integrated circuit (IC) devices. Such attacks are based on the principle that when devices operate on sensitive data, the device's power consumption or EM radiation are correlated with the data values being processed. Thus, data leaks out of the system and it is possible to recover the data from collecting and analyzing power traces.

Hardware security devices, especially the root-of-trust devices, typically employ hardware countermeasures against such attacks. The present disclosure is directed to circuits and methods that may be used as countermeasures against such cyberattacks.

BRIEF DESCRIPTION OF THE DRAWINGS

FIG. 1 illustrates a circuit according to an embodiment.

FIG. 2 illustrates a digital circuit method of preventing cyberattacks according to an embodiment.

DETAILED DESCRIPTION

Figure 3:
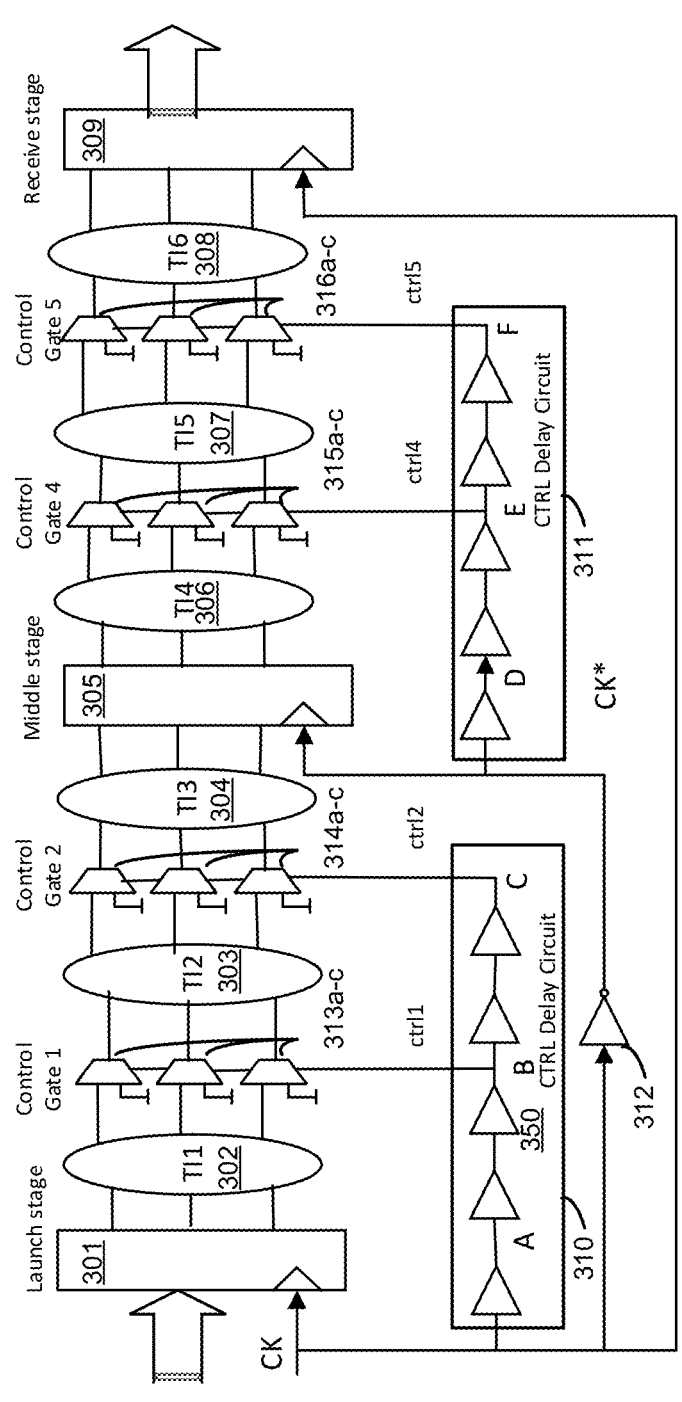
FIG. 3 illustrates an example countermeasure circuit according to an embodiment.

Described herein are circuit techniques for preventing cyberattacks. In the following description, for purposes of explanation, numerous examples and specific details are set forth in order to provide a thorough understanding of some embodiments. Various embodiments as defined by the claims may include some or all of the features in these examples alone or in combination with other features described below and may further include modifications and equivalents of the features and concepts described herein.

FIG. 1 illustrates a circuit according to an embodiment. Features and advantages of the present disclosure include countermeasure techniques for cyberattacks. To prevent cyberattacks, combinational logic may be split into combinational logic portions and shared input bit groups may be applied to different portions of a combinational logic circuit. If the shared input bit groups hold secret information, the secret information may be obfuscated from external observation (e.g., over a power supply or electromagnetic radiation, aka "EMF") when each combinational logic circuit portion processes less than a total of the plurality of shared input bit groups. The circuit of FIG. 1 comprises combinational logic groups 101 and 102. Combinational logic group 101 may comprise a plurality of combinational logic circuits 103 and 104 configured in series (e.g., outputs of an upstream combinational logic circuit are inputs of a downstream combinational logic circuit). Each combinational logic circuit 103 and 104 comprises a plurality of combinational logic circuit portions 110-112 and 120-122, respectively. Each combinational logic circuit portion 110-112 receives one or more of a plurality of shared input bit groups from a register 150 (illustrated by arrows) and produces a shared output bit group. Each combinational logic circuit portion 120-122 receives one or more of a plurality of shared input bit groups formed from the shared output bit groups of an upstream combinational logic circuit (illustrated by arrows) and produces a shared output bit group to register 151. It is to be understood that many additional combinational logic circuits may be configured in series between circuits 103 and 104. The present example is, therefore, merely illustrative.

Combinational logic group 102 comprises combinational logic circuits 105 and 106, which, in turn, comprise combinational logic circuit portions 130-132 and 140-142, respectively. These circuits are configured in substantially the same way as the circuits in combinational logic group 101. Registers may be configured between combinational logic circuit groups. Register 150 and 151 have control inputs. When the control input is triggered (e.g., by a clock signal) data is shifted to the output of the register (e.g., typically from the input of the register).

In this example, shared bit group (S1) at the output of register 150 is coupled to combinational logic circuit portions 110 and 111, a second shared bit group (S2) is coupled to combinational logic circuit portions 110 and 112, and a third shared bit group (S3) is coupled to combinational logic circuit portions 111 and 112. This is just one example of how shared bit groups may be spread out to obfuscate secret data from external detection. In some embodiments, the shared bit groups may be processed by the combination logic circuits to perform a threshold implementation (TI) countermeasure circuit. More generally, the present techniques may be used to control the order of computation without using registers, such as flip flops. Accordingly, the present techniques may be used for other countermeasures (e.g., data masking, etc.) and TI is just one example.

Features and advantages of the present disclosure include a plurality of control gate circuits configured between the plurality of combinational logic circuit portions of the plurality of combinational logic circuit groups. In this illustrative example, control gates 107 are configured between combinational logic circuit portions 110-112 and 120-122 and control gates 108 are configured between combinational logic circuit portions 130-132 and 140-142. Control gates 107 and 108 may comprise control inputs. When a control gate receives a trigger signal on a control input, an input of the control gate is coupled to an output of the control gate. One example of a control gate is a multiplexer (MUX).

Trigger signals for the control gates be generated from delayed versions of a clock signal, CK. The circuit of FIG. 1 may further include a plurality of delay circuits 152 and 154. Each delay circuit is configured between the control input of a particular register and a control input of a control gate circuit. The circuit operates as follows. Register 150 receives a clock signal, CK 155. The rising edge of CK may present shared input data groups on the outputs of register 150. Register 150 may comprise 12 bits, for example, divided into 3 shared bit groups of 4 bits each. Combinational logic circuit portions 110-112 process the shared input bit groups and produce shared output bit groups. CK 155 is delayed by delay circuit 152 so that the delayed clock signal does not trigger the control inputs of the control gates until after the combinational logic circuit portions have finished and the shared output bit groups are stable. The delayed clock then triggers the control gates so the shared output bit groups are coupled to the outputs of the control gates to form the shared input bit groups to downstream combinational logic circuit portions. As mentioned above, there may be many combinational logic circuits (and portions) configured in series. Accordingly, additional delayed versions of the clock signal may be generated for additional control gates between additional combination logic circuits. Additional delays are adjusted so that control gates are triggered after outputs of the combinational logic circuits are stable. Additionally, CK 155 is inverted by inverter 153, and an inverted clock signal is applied as an input to register 151. The inverted clock signal, CK*, may be coupled to delay circuit 154 and used to similarly trigger control gates 108.

FIG. 2 illustrates a digital circuit method of preventing cyberattacks according to an embodiment. At 201, a plurality of shared input bit groups is received in a plurality of combinational logic circuit portions of a plurality of combinational logic circuit groups, each combinational logic circuit group comprising a plurality of combinational logic circuits configured in series, wherein each combinational logic circuit comprises the plurality of combinational logic circuit portions. At 202, a clock signal is received in a plurality of registers configured between plurality of combinational logic circuit groups. Each register has a control input to receive the clock signal. At 203, the clock signal is delayed to produce a plurality of delayed clock signals. At 204, the plurality of delayed clock signals is received in a plurality of control gate circuits configured between plurality of combinational logic circuits of the plurality of combinational logic circuit groups. At 205, each combinational logic circuit portion produces a shared output bit group. The plurality of shared output bit groups of upstream combinational logic circuits form the plurality of shared input bit groups of downstream combinational logic circuits. Additionally, each combinational logic circuit portion of a particular downstream combinational logic circuit receives less than a total of the plurality of shared output bit groups of a particular upstream combinational logic circuit.

Figure 4:
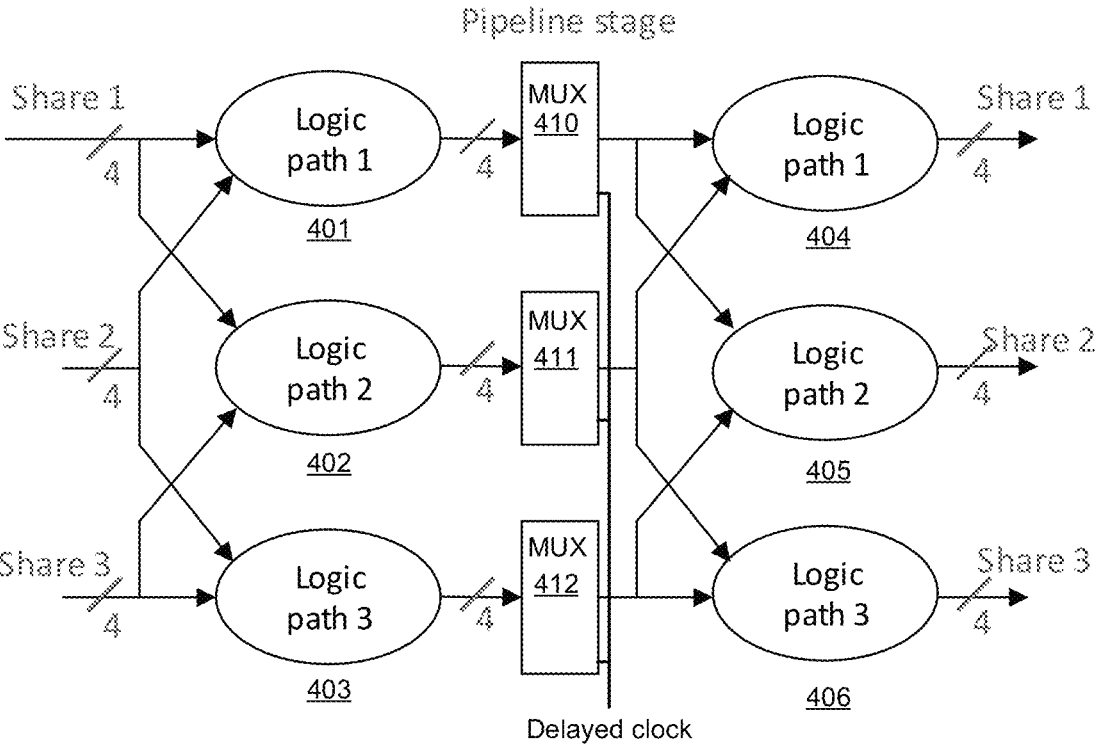
FIG. 4 illustrates an example threshold implementation (TI) countermeasure circuit according to an embodiment.

FIG. 3 illustrates an example countermeasure circuit according to an embodiment. In this example, the circuit is divided into 2 half-parts with one pipeline stage register 305 ("middle stage") inserted in the middle. The half-stage register 305 operate on the negative edge of the system clock, CK. CK is coupled to register 301 to present shared input bit groups to logic circuit 302. As mentioned above, logic circuits may comprise threshold implementation (TI) countermeasure circuit. An example TI circuit is shown in FIG. 4. As illustrated in FIG. 4, groups of shared bits are coupled to different logic circuit paths, such that less than the total bit groups are received by any one path. Paths 401-403 perform one combinational logic function, and shared output bit groups are coupled to MUXs 410-412, which are triggered by a delayed clock. Outputs of MUXs 410-412 are coupled to paths 404-406, which perform another combinational logic function, for example.

Figure 5:
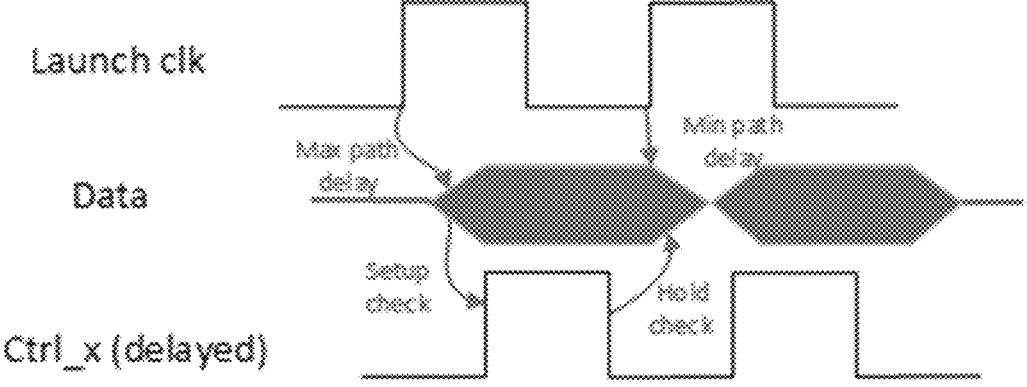
FIG. 5 illustrates a waveform for a countermeasure circuit according to an embodiment.

Referring again to FIG. 3, outputs of TI 302 are coupled to control gates 313a-c. Gate controls are generated by a single configurable delay circuit 310, the input of which is the system clock. Delay circuit 310 may comprise a plurality of delay elements 350, which may comprise two inverters in series, for example. In some embodiments, the delay circuit may be programmable. Delay circuit 310 may comprise multiple outputs coupled to additional control gates, such as control gates 314a-c configured between TI 303 and TI 304. Delay circuit outputs are configured so that the rising edge of the delayed clock arrives at each control gate after the outputs of an upstream logic circuit are stable (for the slowest paths) and before the next outputs of the upstream output data on a subsequent set of inputs (for fastest paths). FIG. 5 illustrates a timing diagram showing timing of an example delayed clock signal to a control input of a control gate. The delayed clocks are delayed until the data at the output of the upstream combinational logic circuit portion is stable, but not so long that the minimum path delay causes the control gate to capture data on a fast path having the minimum path delay, for example. Accordingly, data propagates through TIs 302-304 to the input of register 305.

The control input of register 305 is coupled to an output of inverter 312, which receives CK as an input. Accordingly, TIs 306-308 for the second combinational logic group operate on an inverted clock cycle. Accordingly, the circuit ensures the gate controls for each upstream/downstream combinational logic groups are always returned to the default ("off") state when new data arrives. Inverted clock CK* is coupled to delay circuit 311 to provide trigger signals to control gates 315a-c and 316a-c for TIs 306-308, which operate substantially the same as TIs 302-304.

In the example of FIG. 3, the control gates can be implemented as muxes to mux-in random initial values, or simply '0', in which case the mux degenerates into a AND gate. The middle stages register 305 works in a ping-pong way. When the input CK is in high phase, the control gates in the 1st half (313/314) are turned on as the high phase of CK propagates through the delay circuit and the control gates in the 2nd half (315/316) are turned off as the low phase of CK* propagates through the delay circuit. At the end of CK high-phase, the circuit is in the following state: control gates 313/314 are both on, control gates 315/316 are both off, and computation results from the 1st half are ready (at TI3 output) to be sampled by the middle stage register 305 (e.g., flip flops). When the input CK is in low phase, the opposite happens (control gates 313/314 are turned off and control gates 315/316 are turned on). At the end of CK low-phase, the circuit is in the following state: control gates 313/314 are both off, control gates 315/316 are both on, and full computation results are ready (at TI6 output) to be sampled by the receive stage register 309 and the launch register 301 is ready to accept new data for the next cycle. In this example, the inverted clock stage ensures that the circuit can reliably return to an "off" state during the inactive phase of clock, which may prevent race conditions which causes information leaking, for example.

Advantages of the present disclosure may include any one or more of: significant advantage in latency and throughput over the existing solutions, single-cycle latency is achieved, latency is not dictated by the number of stages, area reduction, low power consumption, easy to adapt to different implementations and process technology (e.g., update delay chain and adjust values), flexibility to separate functional and security timing requirements, and the circuit can be separately tuned for functional correctness and security performance, where delay circuits may be treated as a clock path and gate control signals may be treated as generated clocks, for example.

The techniques described herein may be applied to a wide range of applications. For example, embodiments may be applied to any circuit processing sensitive data (CPU cores and cryptographic accelerators, etc.), a root of trust in a CPU core or hash engine, or a variety of other semiconductor circuits, for example.

FURTHER EXAMPLES

Each of the following non-limiting features in the following examples may stand on its own or may be combined in various permutations or combinations with one or more of the other features in the examples below. Embodiments of the present disclosure may include systems, circuits, and methods.

In one embodiment, the present disclosure includes a circuit comprising: a plurality of combinational logic circuit groups each comprising a plurality of combinational logic circuits configured in series, wherein each combinational logic circuit comprises a plurality of combinational logic circuit portions, and each combinational logic circuit portion receives one or more of a plurality of shared input bit groups and produces a shared output bit group; a plurality of registers configured between plurality of combinational logic circuit groups, each register having a control input; a plurality of control gate circuits configured between the plurality of combinational logic circuit portions of the plurality of combinational logic circuit groups; and a plurality of delay circuits, each delay circuit configured between the control input of a particular register and a control input of a control gate circuit, wherein a plurality of shared output bit groups of upstream combinational logic circuits form the plurality of shared input bit groups of downstream combinational logic circuits, and wherein each combinational logic circuit portion of a particular downstream combinational logic circuit receives less than a total of the plurality of shared input bit groups.

In one embodiment, the shared input bit groups are processed by the combination logic circuits to perform a threshold implementation countermeasure circuit.

In one embodiment, first registers of the plurality of registers coupled to inputs of the combinational logic circuit groups receive the clock signal, and wherein second registers of the plurality of registers coupled to outputs of the combinational logic circuit groups receive an inverse of the clock signal.

In one embodiment, the present disclosure further comprising an inverter coupled to a clock signal, wherein the clock signal is coupled to a first control input of a first register of the plurality of registers and an input of a first delay circuit of the plurality of delay circuits.

In one embodiment, an output of the inverter is coupled to a first control input of a second register of the plurality of registers and an input of a second delay circuit of the plurality of delay circuits.

In one embodiment, the control gate circuits are multiplexers.

In one embodiment, each multiplexer comprises a first input coupled to a particular shared output bit group and a second input coupled to ground.

In one embodiment, a first combinational logic circuit is active in response to a clock signal and a second combinational logic circuit is active in response to an inverted clock signal.

In one embodiment, a first shared input bit group is coupled to a first combinational logic circuit portion and a second combinational logic circuit portion of a combinational logic circuit, a second shared input bit group is coupled to the first combinational logic circuit portion and a third combinational logic circuit portion of the combinational logic circuit, and a third shared input bit group is coupled to the second combinational logic circuit portion and the third combinational logic circuit portion of the combinational logic circuit.

In one embodiment, wherein the delay circuits are programmable delay circuits.

In one embodiment, the delay circuits comprise inverters.

In another embodiment, the present disclosure includes a digital circuit method of preventing cyberattacks comprising: receiving a plurality of shared input bit groups in a plurality of combinational logic circuit portions of a plurality of combinational logic circuit groups, each combinational logic circuit group comprising a plurality of combinational logic circuits configured in series, wherein each combinational logic circuit comprises the plurality of combinational logic circuit portions; receiving a clock signal in a plurality of registers configured between plurality of combinational logic circuit groups, each register having a control input to receive the clock signal; delaying the clock signal to produce a plurality of delayed clock signals; receiving the plurality of delayed clock signals in a plurality of control gate circuits configured between plurality of combinational logic circuits of the plurality of combinational logic circuit groups; and producing, by each combinational logic circuit portion, a shared output bit group, wherein shared output bit groups of upstream combinational logic circuits form shared input bit groups of downstream combinational logic circuits, and wherein each combinational logic circuit portion of a particular downstream combinational logic circuit receives less than a total of the plurality of shared output bit groups of a particular upstream combinational logic circuit.

In another embodiment, the present disclosure includes a circuit comprising: a first register; a first combinational logic circuit group comprising a first plurality of combinational logic circuits configured in series; a second register; a second combinational logic circuit group comprising a second plurality of combinational logic circuits configured in series, wherein each combinational logic circuit comprises a plurality of combinational logic circuit portions, and each combinational logic circuit portion receives one or more of a plurality of shared input bit groups and produces a shared output bit group, wherein each combinational logic circuit portion of a particular downstream combinational logic circuit receives less than a total of the plurality of shared input bit groups; a plurality of multiplexers configured between the plurality of combinational logic circuit portions, each multiplexer having one input coupled to ground; a first delay circuit configured between a control input of the first register and a control input of a first portion of the multiplexers; and a second delay circuit configured between a control input of the second register and a control input of a second portion of the multiplexers, wherein a plurality of shared output bit groups of upstream combinational logic circuits form the shared input bit groups of downstream combinational logic circuits, and wherein the downstream combinational logic circuits receive shared input bit groups in response to delayed versions of the clock signal.

The above description illustrates various embodiments along with examples of how aspects of some embodiments may be implemented. The above examples and embodiments should not be deemed to be the only embodiments, and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:
1. A circuit comprising:
a plurality of combinational logic circuit groups each comprising a plurality of combinational logic circuits configured in series, wherein each combinational logic circuit comprises a plurality of combinational logic circuit portions, and each combinational logic circuit portion receives one or more of a plurality of shared input bit groups and produces a shared output bit group;

a plurality of registers configured between the plurality of combinational logic circuit groups, each register having a control input;

a plurality of control gate circuits configured between the plurality of combinational logic circuit portions of the plurality of combinational logic circuit groups; and a plurality of delay circuits, each delay circuit configured between the control input of a particular register and a control input of a control gate circuit, wherein a plurality of shared output bit groups of upstream combinational logic circuits form the plurality of shared input bit groups of downstream combinational logic circuits, and wherein each combinational logic circuit portion of a particular downstream combinational logic circuit receives less than a total of the plurality of shared input bit groups.

2. The circuit of claim 1, wherein the shared input bit groups are processed by the combination logic circuits to perform a threshold implementation countermeasure circuit.

3. The circuit of claim 1, wherein first registers of the plurality of registers coupled to inputs of the combinational logic circuit groups receive a clock signal, and wherein second registers of the plurality of registers coupled to outputs of the combinational logic circuit groups receive an inverse of the clock signal.

4. The circuit of claim 1, further comprising an inverter coupled to a clock signal, wherein the clock signal is coupled to a first control input of a first register of the plurality of registers and an input of a first delay circuit of the plurality of delay circuits.

5. The circuit of claim 4, wherein an output of the inverter is coupled to a first control input of a second register of the plurality of registers and an input of a second delay circuit of the plurality of delay circuits.

6. The circuit of claim 1, wherein the control gate circuits are multiplexers.

7. The circuit of claim 6, wherein each multiplexer comprises a first input coupled to a particular shared output bit group and a second input coupled to ground.

8. The circuit of claim 1, wherein a first combinational logic circuit is active in response to a clock signal and a second combinational logic circuit is active in response to an inverted clock signal.

9. The circuit of claim 1, wherein a first shared input bit group is coupled to a first combinational logic circuit portion and a second combinational logic circuit portion of a combinational logic circuit, a second shared input bit group is coupled to the first combinational logic circuit portion and a third combinational logic circuit portion of the combinational logic circuit, and a third shared input bit group is coupled to the second combinational logic circuit portion and the third combinational logic circuit portion of the combinational logic circuit.

10. The circuit of claim 1, wherein the delay circuits are programmable delay circuits.

11. The circuit of claim 1, wherein the delay circuits comprise inverters.

12. A method of preventing cyberattacks comprising:

receiving a plurality of shared input bit groups in a plurality of combinational logic circuit portions of a plurality of combinational logic circuit groups, each combinational logic circuit group comprising a plurality of combinational logic circuits configured in series, wherein each combinational logic circuit comprises the plurality of combinational logic circuit portions;

receiving a clock signal in a plurality of registers configured between the plurality of combinational logic circuit groups, each register having a control input to receive the clock signal;

delaying the clock signal to produce a plurality of delayed clock signals;

receiving the plurality of delayed clock signals in a plurality of control gate circuits configured between the plurality of combinational logic circuits of the plurality of combinational logic circuit groups; and producing, by each combinational logic circuit portion, a shared output bit group, wherein shared output bit groups of upstream combinational logic circuits form shared input bit groups of downstream combinational logic circuits, and wherein each combinational logic circuit portion of a particular downstream combinational logic circuit receives less than a total of the plurality of shared output bit groups of a particular upstream combinational logic circuit.

13. The method of claim 12, wherein first registers of the plurality of registers coupled to inputs of the combinational logic circuit groups receive the clock signal, and wherein second registers of the plurality of registers coupled to outputs of the combinational logic circuit groups receive an inverse of the clock signal.

14. The method of claim 12, wherein the shared input bit groups are processed by the combination logic circuits to perform a threshold implementation countermeasure circuit.

15. The method of claim 12, further comprising inverting the clock signal, wherein the clock signal is coupled to a first control input of a first register of the plurality of registers and an input of a first delay circuit of the plurality of delay circuits.

16. The method of claim 12, wherein the control gate circuits are multiplexers.

17. The method of claim 16, wherein each multiplexer comprises a first input coupled to a particular shared output bit group and a second input coupled to ground.

18. The method of claim 12, wherein a first combinational logic circuit is active in response to the clock signal and a second combinational logic circuit is active in response to an inverted clock signal.

19. The method of claim 18, wherein a first shared input bit group is coupled to a first combinational logic circuit portion and a second combinational logic circuit portion of a first combinational logic circuit, a second shared input bit group is coupled to the first combinational logic circuit portion and a third combinational logic circuit portion of the first combinational logic circuit, and a third shared input bit group is coupled to the second combinational logic circuit portion and the third combinational logic circuit portion of the first combinational logic circuit.

20. A circuit comprising:

a first register that receives a clock signal;

a first combinational logic circuit group comprising a first plurality of combinational logic circuits configured in series;

a second register;

a second combinational logic circuit group comprising a second plurality of combinational logic circuits configured in series, wherein each combinational logic circuit comprises a plurality of combinational logic circuit portions, and each combinational logic circuit portion receives one or more of a plurality of shared input bit groups and produces a shared output bit group, wherein each combinational logic circuit portion of a particular downstream combinational logic circuit receives less than a total of the plurality of shared input bit groups;

a plurality of multiplexers configured between the plurality of combinational logic circuit portions, each multiplexer having one input coupled to ground;

a first delay circuit configured between a control input of the first register and a control input of a first portion of the multiplexers; and a second delay circuit configured between a control input of the second register and a control input of a second portion of the multiplexers, wherein a plurality of shared output bit groups of upstream combinational logic circuits form the shared input bit groups of downstream combinational logic circuits, and wherein the downstream combinational logic circuits receive shared input bit groups in response to delayed versions of the clock signal.

* * * * *